United States Patent
Cai et al.

(10) Patent No.: US 8,718,140 B1
(45) Date of Patent: May 6, 2014

(54) ENCODING VIDEO DATA

(75) Inventors: Yang Cai, San Jose, CA (US); Chin-Yee Lin, Los Gatos, CA (US)

(73) Assignee: VisualOn, Inc., Santa Clara, CA (US)

( * ) Notice: Subject to any disclaimer, the term of this patent is extended or adjusted under 35 U.S.C. 154(b) by 2197 days.

(21) Appl. No.: 11/128,126

(22) Filed: May 12, 2005

(51) Int. Cl.
  *H04N 7/12* (2006.01)
  *H04N 11/02* (2006.01)
  *H04N 11/04* (2006.01)
  *H04N 7/26* (2006.01)

(52) U.S. Cl.
  CPC ... *H04N 19/00072* (2013.01); *H04N 19/00133* (2013.01); *H04N 19/00278* (2013.01)
  USPC ............ 375/240.16; 375/240.12; 375/240.01; 375/240.15; 375/240.26

(58) Field of Classification Search
  CPC .................. H04N 19/00072; H04N 19/00133; H04N 19/00278
  USPC ............. 375/240.16, 240.12, 240.01, 240.15, 375/240.26
  See application file for complete search history.

(56) References Cited

U.S. PATENT DOCUMENTS 6,625,319 B1 * 9/2003 Krishnamachari ............ 382/238
2005/0129125 A1 * 6/2005 Cha et al. .................. 375/240.16

OTHER PUBLICATIONS

Thomas Wiegand, Gary J. Sullivan, Gisle Bjontegaard, Ajay Luthra, *Overview of the H.264 / AVC Video Coding Standard*; IEEE Transactions on Circuits and Systems for Video Technology, Jul. 2003.

* cited by examiner

*Primary Examiner* — Geepy Pe
(74) *Attorney, Agent, or Firm* — Van Pelt, Yi & James LLP

(57) ABSTRACT

A method of encoding video data comprises calculating a set of parameter values for a basis set of partition blocks of a macroblock of the video data. The basis set comprising one or more partition blocks into which the macroblock could validly be partitioned under an encoding scheme, wherein the basis set of partition blocks is smaller in number than the number of ways into which a macroblock is partitionable for encoding. The method further comprises constructing a desired partitioned macroblock using one or more partition blocks selected from the basis set based at least in part on the set of parameter values.

30 Claims, 15 Drawing Sheets

Basis Set of 41 Partition Blocks

ENCODING VIDEO DATA

BACKGROUND OF THE INVENTION

Video encoding using standards such as MPEG-4 AVC/H.264 offer many modes for achieving compression of the video data stream. Tradeoffs between computation time, complexity, and quality need to be considered in designing video encoding algorithms according to the standards. In addition to the many modes, video encoding also has the additional complexity of being able to encode different sized smaller units of a video frame. An efficient compression of a video frame will contain different encodings of different sized smaller units within a single video frame. To encode all of the different combination of modes and smaller units of a video frame requires substantial computation in order to find an efficient solution for encoding. It would be useful to be able to find an efficient solution without having to encode all combinations of modes and smaller units of a video frame.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient cost estimation and mode selection for macroblock video encoding is disclosed. In one embodiment, a basis set of partition blocks is selected. The basis set includes one or more partition blocks into which a macroblock of video data could validly be partitioned under an encoding scheme such that each partitioned macroblock that it would be permissible under an applicable encoding scheme to construct for the macroblock can be created by combining one or more of the partition blocks in the basis set. A set of parameter values is calculated for the basis set of partition blocks. A desired partitioned macroblock is constructed using one or more partition blocks selected from the basis set based at least in part on the set of parameter values. By using the basis set of partition blocks and their associated parameter values, all permitted partitions of the macroblock can be calculated to find an efficient encoding solution.

Figure 1:
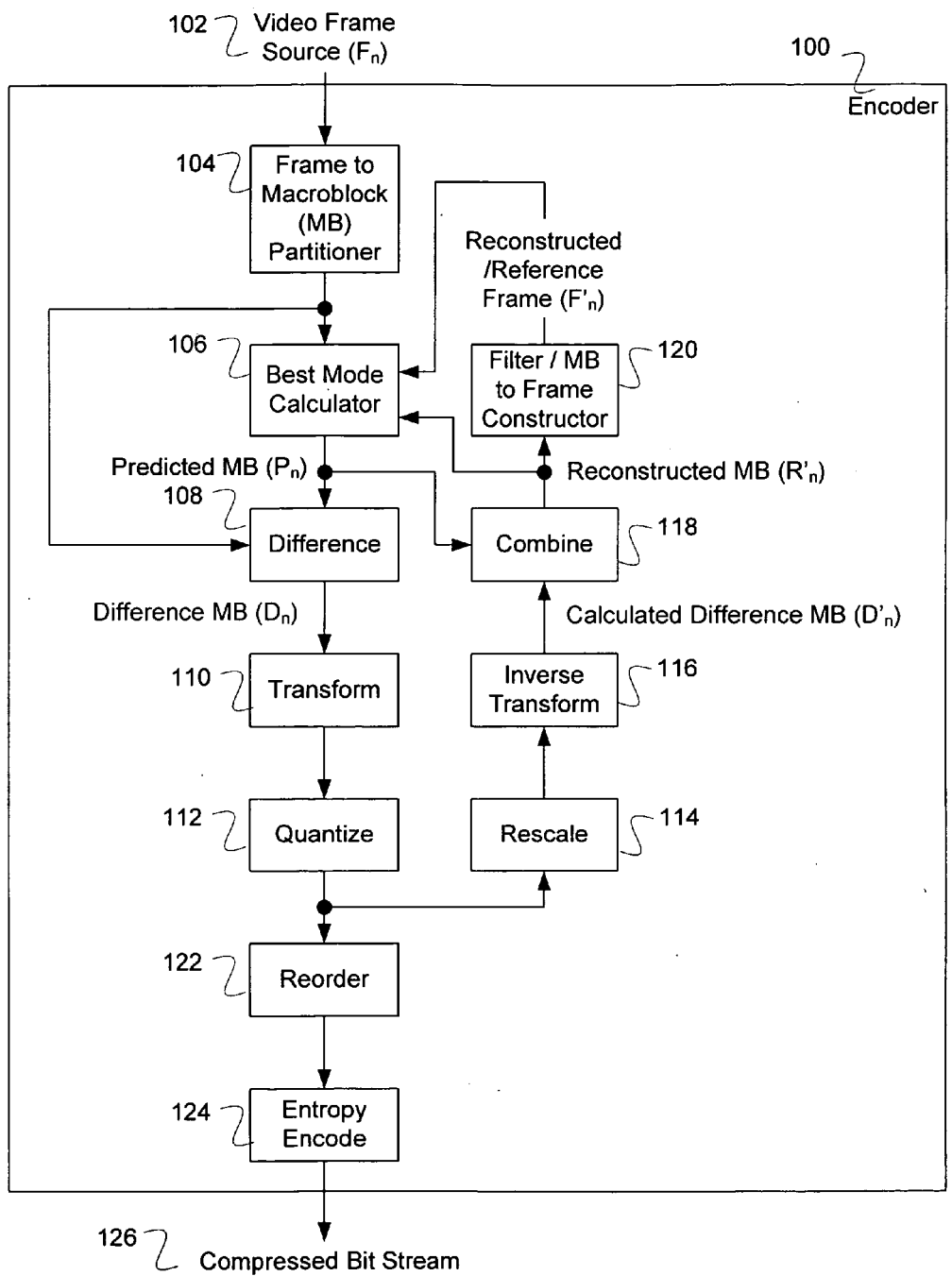
FIG. 1 illustrates an embodiment of an encoder system.

FIG. 1 illustrates an embodiment of an encoder system. In the example shown, encoder 100 has as input video frame source ($F_n$) 102 and as output compressed bit stream 126. In various embodiments, encoder 100 encodes the input video frame source in accordance with the MPEG2 standard or the H.264/MPEG4-AVC standard. In some embodiments, a video frame is 720 pixels wide by 480 pixels high, and the video frames are displayed at 30 frames per second. Input video frame source ($F_n$) 102 is partitioned into macroblocks by frame to macroblock partitioner 104. A macroblock (MB) is a block of 16 by 16 pixels. Each macroblock is video encoded separately. The macroblocks resulting from partitioning $F_n$ are encoded by best mode calculator 106 to create predicted macroblocks ($P_n$). In some embodiments, best mode calculator 106 selects from intra and inter modes to find an efficient encoding mode for a given macroblock.

Intra mode encoding predicts macroblock pixel values from neighboring pixel values within the current frame and where the encoding only includes the intra mode and prediction errors in the compressed bit stream. In intra mode encoding, prediction errors are the differences between the macroblock pixels and the neighboring pixel values within the current frame used for encoding.

Inter mode encoding predicts macroblock pixels values from pixel values at offset locations, calculated from motion vectors, in a reference frame. Reference frames can be forward or backward in time. Reference frames are decoded from encoded data stream with filtering to eliminate artifacts. In inter mode encoding, motion vectors and differences, called prediction errors, between the motion vector predicted pixel values and the actual macroblock pixel values are encoded. In some embodiments, deblocking filtering is performed to remove block artifacts created by video encoding. To further improve compression, a macroblock can be partitioned and, in some cases, subpartitioned to provide lower compression costs because smaller pixel areas can be more accurately compressed using motion vectors and predictions errors.

Difference macroblock ($D_n$), which is the difference between $F_n$ and $P_n$, is calculated in difference 108. $D_n$ is transformed by transform 110 and quantized by quantize 112. In various embodiments, transform 110 uses discrete cosine transforms, integer transforms, or wavelet transforms. The output of quantize 112 is input to reorder 122 and entropy encode 124 to create compressed bit stream 126. In some embodiments, quantize 112 quantizes the transformed Dn to reduce the number of bits required to represent them. In some embodiments, reorder 122 reorders the 2-dimensional array of quantized values into a 1-dimensional array. Entropy encoding by entropy encode 124 maps real data to different length codes based on a statistical model where shorter codes are used for more common data sequences. In some embodiments, entropy encoding uses variable length encoding. In some embodiments, entropy encoding uses context-based adaptive binary arithmetic encoding.

The output of quantize 112 is also input to rescale 114 which rescales to adjust for quantize 112 processing. Rescale 114 output is inverse transformed using inverse transform 116 to create a calculated difference macroblock ($D'_n$). In some embodiments, inverse transform 116 uses inverse discrete cosine transforms or inverse integer transforms. Combine 118 combines $D'_n$ and $P_n$, to create a reconstructed macroblock ($R'_n$). $R'_n$ are filtered and constructed into reference frames or the reconstructed video $F'_n$ by filter/macroblock to frame constructor 120. In some embodiments, the filter in filter/macroblock to frame constructor 120 is a deblocking filter.

In some embodiments, one or more of the blocks 104-124 of encoder 100 in FIG. 1 comprises one or more software and/or hardware modules.

Figure 2:
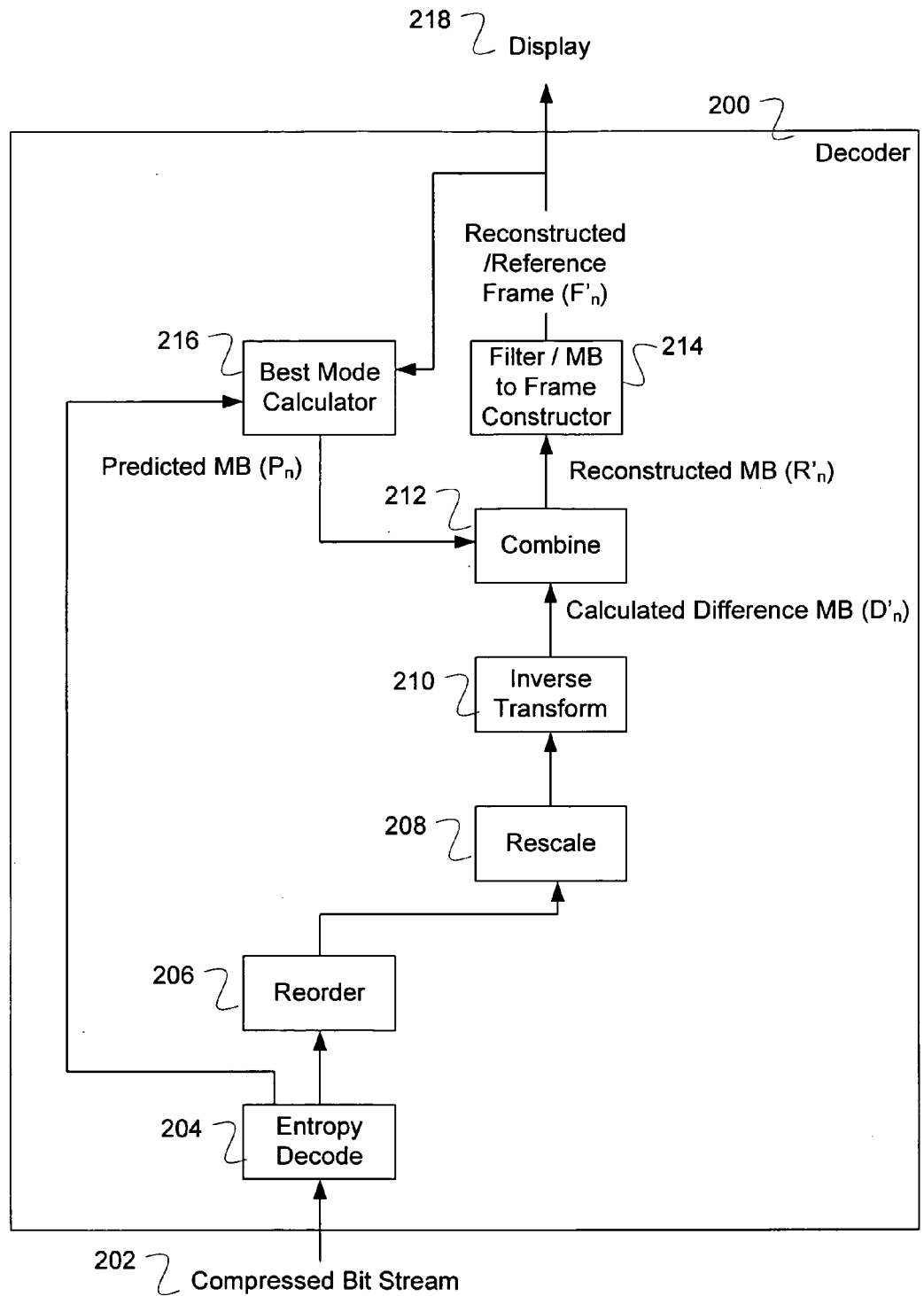
FIG. 2 illustrates an embodiment of a decoder system.

FIG. 2 illustrates an embodiment of a decoder system. In the example shown, decoder 200 has as input compressed bit stream 202 and as output reconstructed video $F'_n$. In various embodiments, decoder 200 decodes the input compressed bit stream in accordance with the MPEG2 standard or the H.264/MPEG4-AVC standard. Compressed bit stream 202 is entropy decoded by entropy decode 204. Entropy decoding maps different length codes to data based on a statistical model. In some embodiments, entropy decoding uses variable length decoding. In some embodiments, entropy decoding uses context-based adaptive binary arithmetic decoding. Entropy decode 204 outputs to reorder 206 which reorders the data stream. Entropy decode 204 also outputs best mode decoding to best mode calculator 216.

Reorder 206 outputs to rescale 208 which rescales to adjust for the quantization processing. Rescale 208 output is inverse transformed using inverse transform 210 to create a calculated difference macroblock ($D'_n$). In various embodiments, inverse transform 210 uses inverse discrete cosine transforms, inverse integer transforms or inverse wavelet transforms. Combine 212 combines $D'_n$ and $P_n$, to create a reconstructed macroblock ($R'_n$). $R'_n$ are filtered and constructed into reference frames and/or the reconstructed video $F'_n$ by filter/macroblock to frame constructor 214. The reconstructed video is sent to display 218. In some embodiments, the filter in filter/macroblock to frame constructor is a deblocking filter. Data from the reference frames $F'_n$ is calculated based on the encoded best mode by best mode calculator 216 to create predicted macroblock ($P_n$).

In some embodiments, one or more of the blocks 204-216 of decoder 200 in FIG. 2 comprises one or more software and/or hardware modules.

Figure 3:
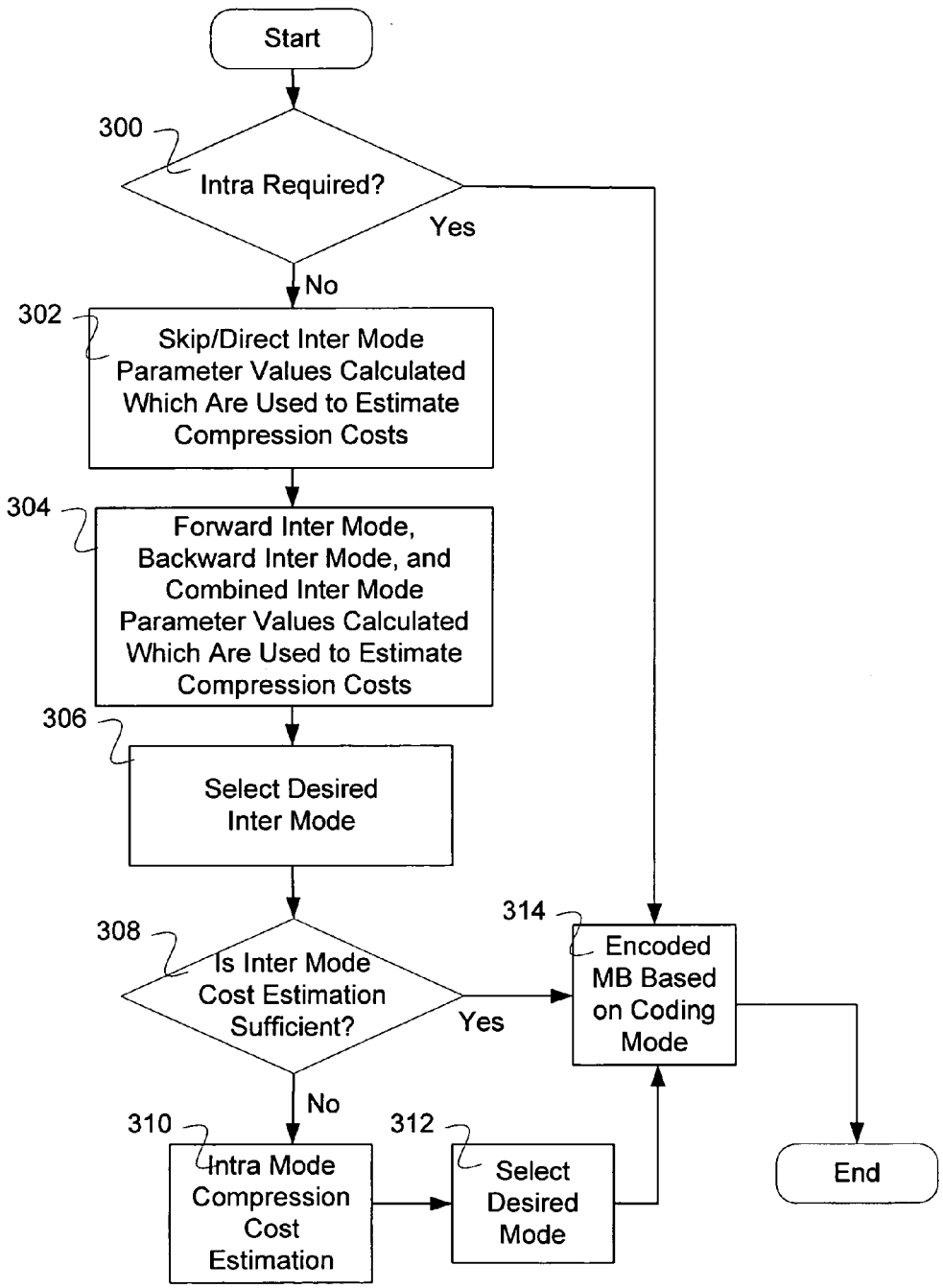
FIG. 3 illustrates an embodiment of a process for calculating best mode.

FIG. 3 illustrates an embodiment of a process for calculating best mode. In the example illustrated, it is determined in 300 if intra mode is required. In some embodiments, a heuristic is used to determine if intra mode is required. In some embodiments, the heuristic includes rules that say that first video frames are intra mode encoded. If it is determined that intra mode is required, the macroblock is encoded in 314 using intra mode. If it is determined that intra mode is not required, then skip/direct inter mode compression costs are estimated in 302. Skip/direct modes use a predefined motion vector with no prediction errors or with prediction errors included in the compressed bit stream. In some embodiments, if the skip/direct modes have a sufficiently low compression cost estimate, then the MB is encoded using the skip/direct mode that achieves the sufficiently low compression cost. In some embodiments, compression cost of an inter mode for a macroblock is the total number of bits required to encode it according to the specification of the video compression standard. The total number of bits includes: a) bits to encode the prediction residuals, b) bits to encode the motion vectors, and c) bits to encode the identifications of the reference pictures—the reference picture list the reference picture belongs to and its location in the list. The compression cost can be best calculated if the macroblock is encoded. In some embodiments, an estimate of the compression cost is used instead of full encoding to decide the best mode for encoding. In some embodiments, the estimated compression cost includes a) the sum of absolute differences (SAD) values from the partition blocks, b) the motion vector cost—the cost of storing the difference between the value found and the standard-defined predicted motion vector, and c) the reference picture identifier costs. In some embodiments, the estimated compression cost is the sum of the elements in the estimated compression cost.

In 304, forward inter mode, backward inter mode, and combined inter mode parameter values are calculated and these parameter values are used to estimate compression costs. Forward inter mode uses reference frames from a first list, typically but not necessarily comprising frames prior to the frame currently being encoded, to estimate compression costs. Backward inter mode uses reference frames from a second list, typically but not necessarily comprising frames subsequent to the frame currently being encoded, to estimate compression costs. In some embodiments, a reference frame may appear in both the first list and the second list. In this case, parameter values used to estimate compression costs do not need to be recalculated for the reference frame when encountered again. Combined inter mode uses a combination of two reference frames in calculating parameter values that are used in the compression costs estimates.

In various embodiments, if during the exploration of any of the different modes, a mode has a sufficiently low compression cost estimate, then the macroblock is encoded using this mode and further encoding modes or options are not considered. In some embodiments, a heuristic is used to determine whether the estimate cost of encoding using a particular mode result is sufficiently low such that the mode is used without considering further possible modes (e.g., other inter modes or intra mode).

In 306, the desired inter mode is selected based on which inter mode has the lowest estimated compression cost. In 308, it is determined if the inter mode cost estimate is sufficient. In some embodiments, a heuristic is applied in 308 to determine whether the estimate cost of encoding using the inter mode result identified in 306 is sufficiently low that the inter mode is used without considering further possible modes (e.g., intra mode). If the inter mode cost estimate is sufficient, then the macroblock is encoded in 314 using the selected inter mode. If the inter mode cost estimate is not sufficient, then intra mode compression cost is estimated in 310. In 312, the desired mode is selected by comparing the estimated cost associated with the "best" inter mode result determined in 306 with the estimated cost determined in 310 for the intra mode. In 314, macroblock is encoded using the selected mode.

Figure 4:
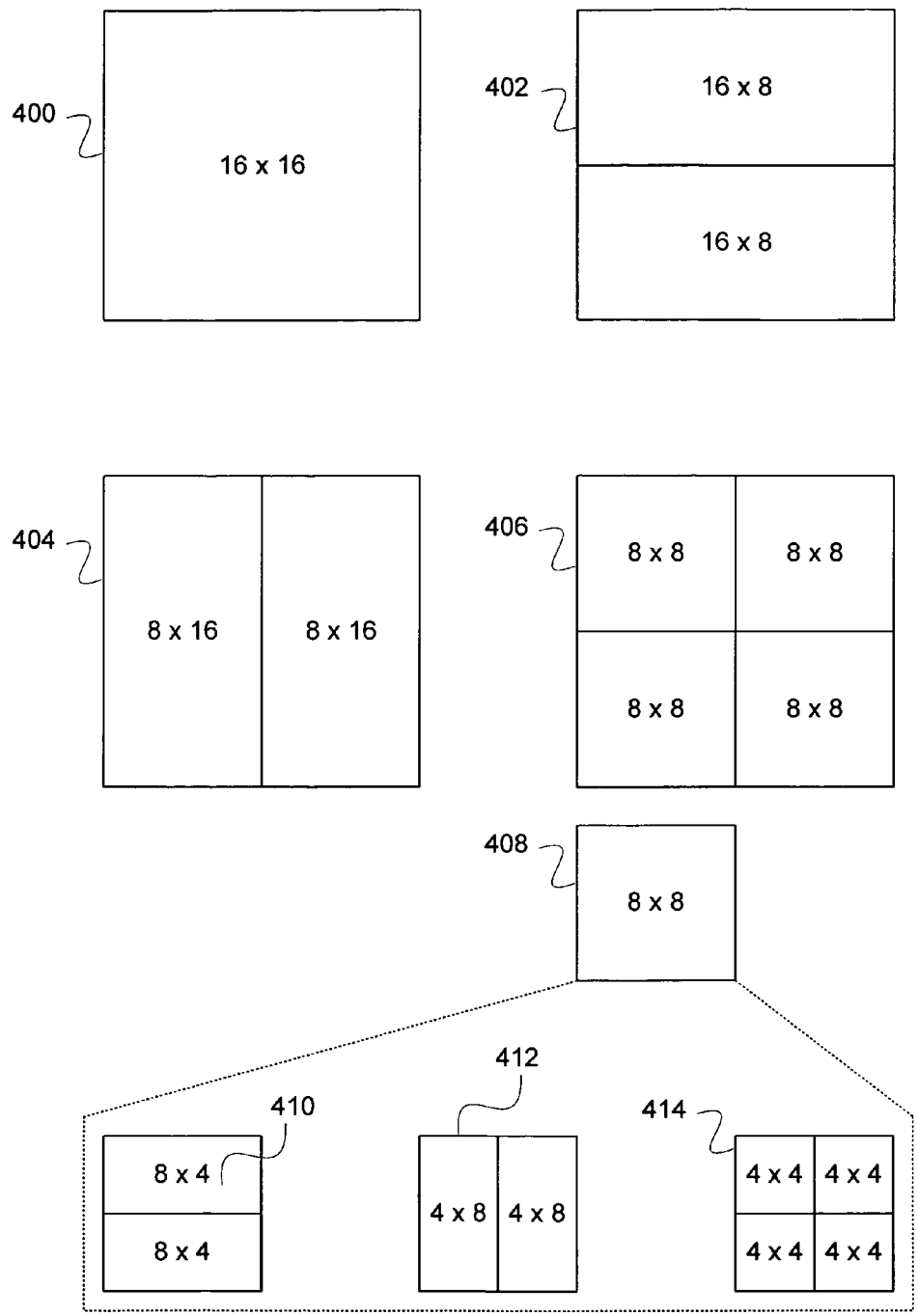
FIG. 4 illustrates an example of macroblocks partitioned and subpartitioned in one embodiment.

FIG. 4 illustrates an example of macroblocks partitioned and subpartitioned in one embodiment. A partitioned macroblock is a macroblock that has been partitioned into one or more partition blocks. In the example illustrated, there are four types of first order partition blocks: a) a single first order partition block with a 16 pixel by 16 pixel area (labeled 400), b) a horizontal first order partition block with a 16 pixel by 8 pixel area (two of which are combined to form a 16×16 macroblock and are labeled 402), c) a vertical first order partition block with 8 pixel by 16 pixel area (two of which are combined to form a 16×16 macroblock and are labeled 404), and d) a quadruple first order partition block with a 8 pixel by 8 pixel area (four of which are combined to form a 16×16 macroblock and are labeled 406).

A quadruple first order partition block can be further partitioned, or subpartitioned, into one of four types of second order partition block: a) a single second order partition block with a 8 pixel by 8 pixel area (which is the same as a quadruple first order partition block labeled 408), b) a horizontal second order partition block with a 8 pixel by 4 pixel area (two of which are combined to form an 8×8 quadruple first order partition block and are labeled 410), c) a vertical second order partition block with a 4 pixel by 8 pixel area (two of which are combined to form an 8×8 quadruple first order partition block and are labeled 412), and d) a quadruple second order partition block with a 4 pixel by 4 pixel area (four of which are combined to form an 8×8 quadruple first order partition block and are labeled 414).

Under the scheme described above, there are 259 different ways of partitioning a macroblock: 1 (single first order partition block)+1 (two horizontal first order partition blocks)+1 (two vertical first order partition blocks)+$4^4$ (all the combinations of the second order partition blocks in each of the positions of the four quadruple first order partition blocks).

Figure 5:
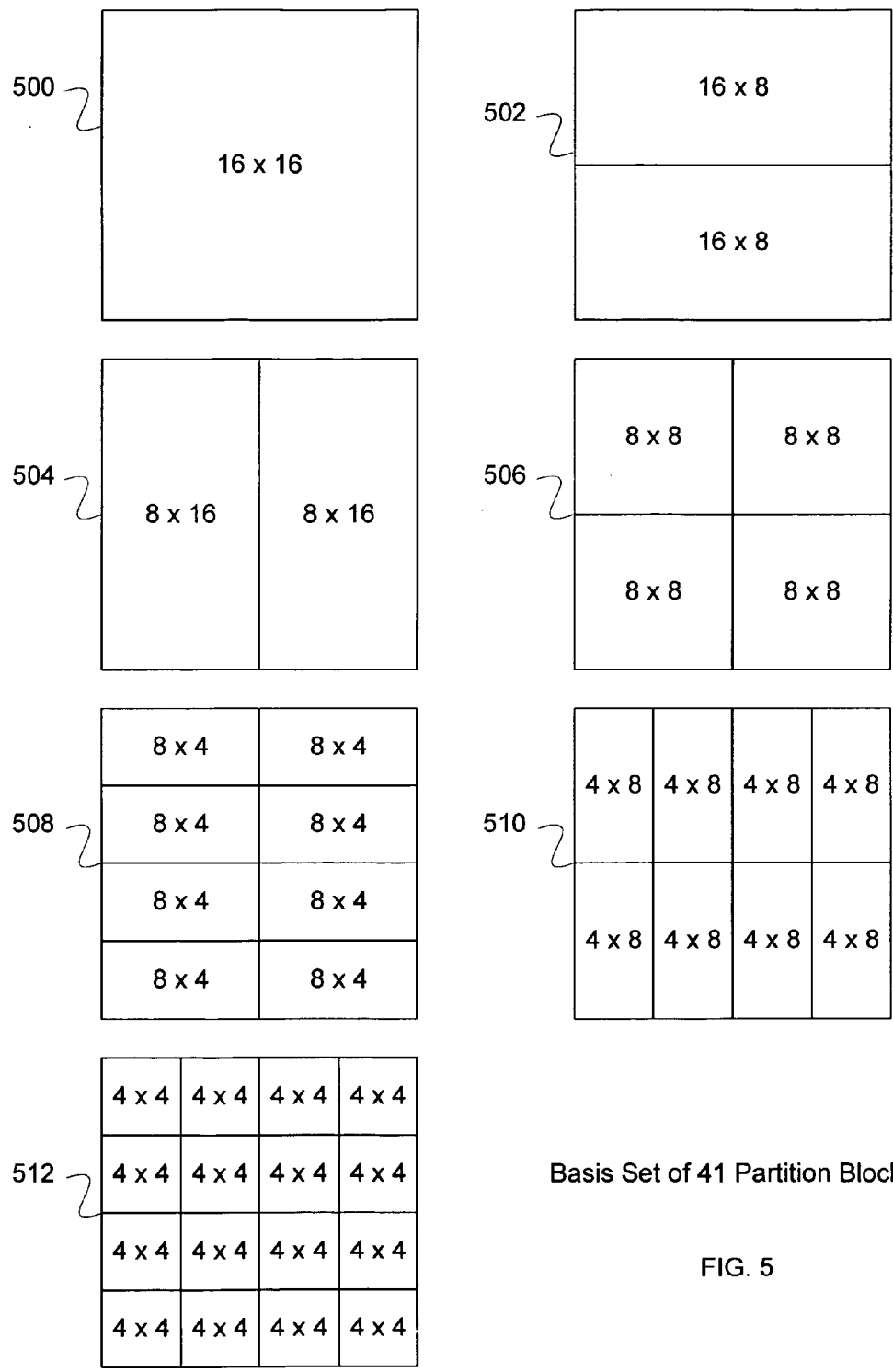
FIG. 5 illustrates an example of a basis set of partition blocks in one embodiment.

FIG. 5 illustrates an example of a basis set of partition blocks in one embodiment. A basis set of partition blocks that is smaller in number than the number of ways into which a macroblock or other set of video data may be partitioned for encoding can be used instead of computing and tracking data for each possible way of partitioning the data. In the example illustrated, there are 41 partition blocks formed into seven 16 pixel by 16 pixel blocks: a) a single first order partition block with a 16 by 16 pixel area (500), b) an upper and a lower horizontal first order partition block (502), each with a 16 by 8 pixel area, c) a left and a right vertical first order partition block (504), each with a 8 by 16 pixel area, d) four quadruple partition blocks (506), each with an 8 by 8 pixel area, e) eight horizontal second order partition blocks (508), each with an 8 by 4 pixel area, f) eight vertical second order partition blocks (510), each with a 4 by 8 pixel area, and g) sixteen quadruple second order partition blocks (512), each with a 4 by 4 pixel area. From this basis set of 41 partition blocks, the 259 different partitioned macroblocks that can be formed under the encoding standard (in this case H.264) can be constructed. In other embodiments, e.g., those in which a standard other than H.264 is used, the number of different partitioned macroblocks that could be formed and/or the number of partition blocks in the basis set may be different than the example shown in FIG. 5. In some embodiments, the basis set includes a minimum number of blocks based on which at least a subset of the different partitioned macroblocks that can be formed under the applicable standard (or other scheme) can be constructed.

In some embodiments, calculation and use of memory is made efficient by storing seven 16 by 16 arrays, one corresponding to each of the seven partition block shapes as shown in FIG. 5. In these arrays, the predicted values for each pixel in the macroblock, if included in a partition block of the configuration associated with that particular 16 by 16 array, are stored. In some embodiments, a set of seven 16 by 16 arrays is stored for each reference frame under consideration, enabling an optimization to be performed across reference frames, e.g., those in a particular reference frame list. In addition to the seven 16 by 16 arrays, a corresponding selected (e.g., "best") motion vector and the corresponding parameter values, including the sum of absolute difference (SAD) values between the predicted pixel values and the actual pixel values are also stored for each of the 41 partition blocks of the basis set.

As described more fully below, in some embodiments the predicted values, motion vector, and parameter value information for the 41 partition blocks of the basis set are used to construct an "best" partitioned macroblock (i.e., a macroblock constructed by combining partition blocks from the basis set that are associated with "best" motion vectors and predicted values for the macroblock being encoded).

Figure 6:
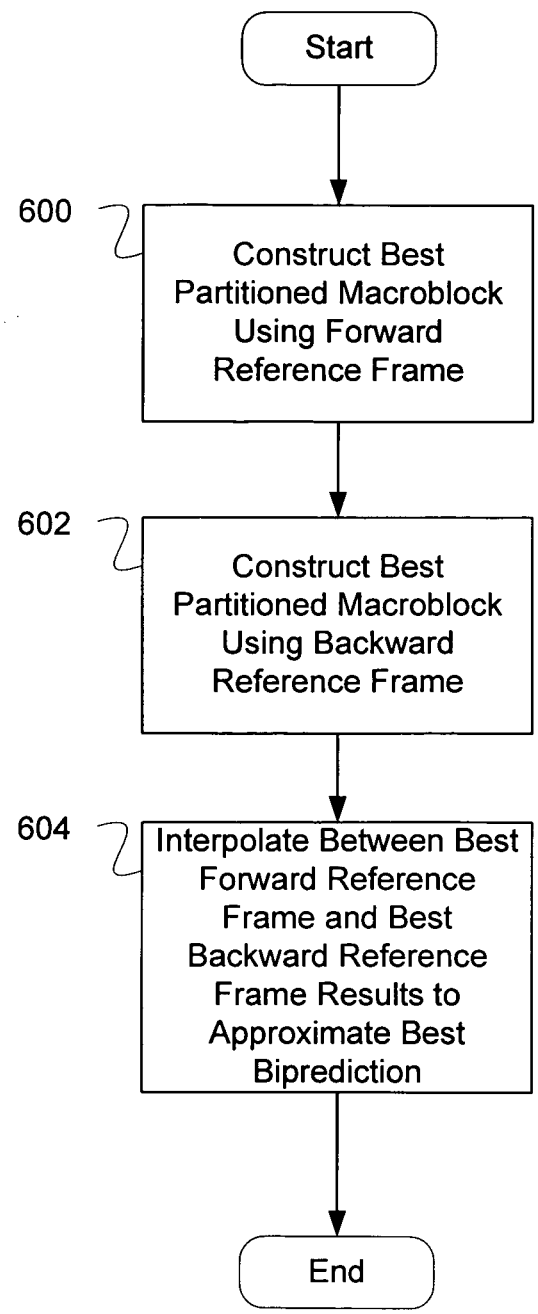
FIG. 6 illustrates an embodiment of a process for constructing a best partitioned macroblock using inter prediction mode.

FIG. 6 illustrates an embodiment of a process for constructing a best partitioned macroblock using inter prediction mode. In some embodiments, the process of FIG. 6 is used to implement 304 of FIG. 3. In the example illustrated, in 600 a best partitioned macroblock is constructed using a forward (or other first) reference frame list. The best partitioned macroblock is constructed by calculating parameter values used to estimate the cost of encoding the block including the best SAD values, the motion vectors corresponding to the best SAD values, and the corresponding predicted values for each basis partition block. In 602, a best partitioned macroblock is constructed using a backward (or other second) reference frame list. In 604, the best forward reference frame result determined in 600 and the best backward reference frame result determined in 602 are interpolated to find an approximate best biprediction partitioned macroblock. Using the approach shown in FIG. 6 may not in all cases determine the true, globally best biprediction result, but in some embodiments the approach shown in FIG. 6 is used to speed processing and/or conserve resources by not searching separately for the combination of forward and backward reference frames that yields the globally optimal biprediction.

In some embodiments, in 604 a globally optimal solution for biprediction result is located. In some embodiments, in 604 the best biprediction partitioned macroblock is determined by searching all the combinations of forward and backward reference frames. The best motion vector/fractional motion vector for each forward reference frame and for each backward reference frame can then be determined for each of the basis partition blocks. The best macroblock solution for each of the forward and backward reference frames can then be determined using the basis set partition block information. The best combination of a forward reference frame and a backward reference frame can then be determined by searching all combinations of the best macroblock solutions for each of the forward and backward reference frames.

Figure 7:
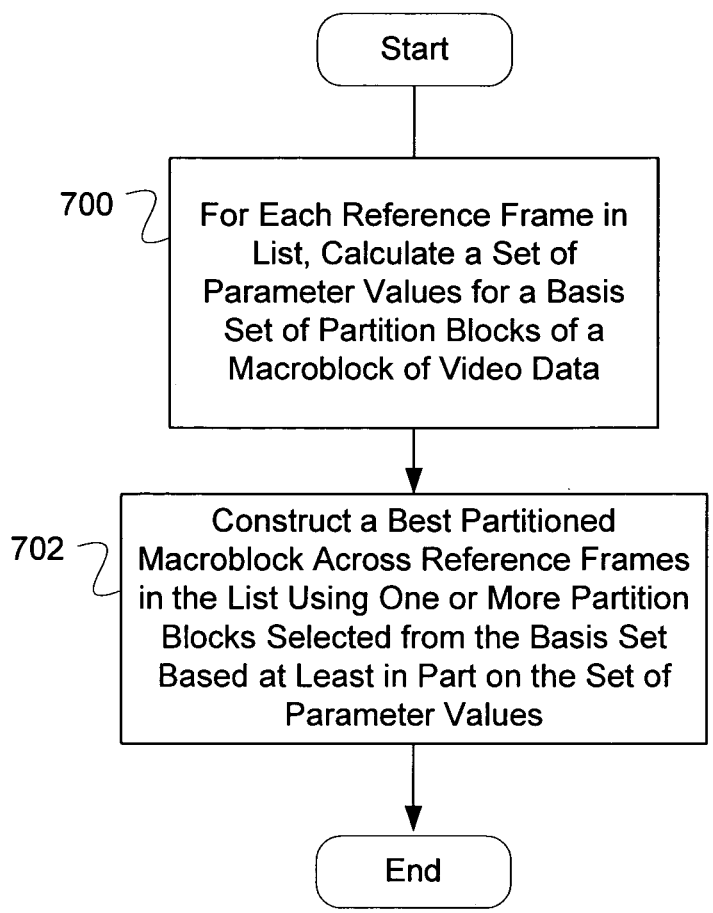
FIG. 7 illustrates an embodiment of a process for constructing a best partitioned macroblock.

FIG. 7 illustrates an embodiment of a process for constructing a best partitioned macroblock. In some embodiments, the process of FIG. 7 is used to implement 600 and 602 of FIG. 6. In the example illustrated, in 700 for each reference frame in the list being processed a set of parameter values for a basis set of partition blocks of a macroblock of video data is calculated. In some embodiments, the parameter values calculated in 700 include for each partition block in the basis set a "best" motion vector and a corresponding "best" sum of absolute difference (SAD) value across the reference frames in the list. The SAD values are derived from predicted values associated with the pixels comprising the partition block. In some embodiments, the "best" motion vector and associated parameter values are determined as described below in FIGS. 8 and 9. In 702, a best partitioned macroblock is constructed using one or more partition blocks selected from the basis set based at least in part on the set of parameter values. In some embodiments, the best partitioned macroblock is constructed using one or more partition blocks as described below in FIGS. 10, 11, 13, and 15.

In some embodiments, the process of FIG. 7 terminates early and a "good enough" result is used to encode the macroblock if at the completion of processing a reference frame the result with respect to that frame, or the best result as determined to that point, is determined by applying a heuristic and/or criteria to be good enough, in the sense that the estimate cost of encoding is low enough that the result associated with current reference frame (or other result) should be used to encode the macroblock without consuming further time and/or resources attempting to find a more optimal result. In such embodiments, the process of FIG. 7 continues to completion if an applicable early exit criterion is not satisfied prior to completion.

Figure 8:
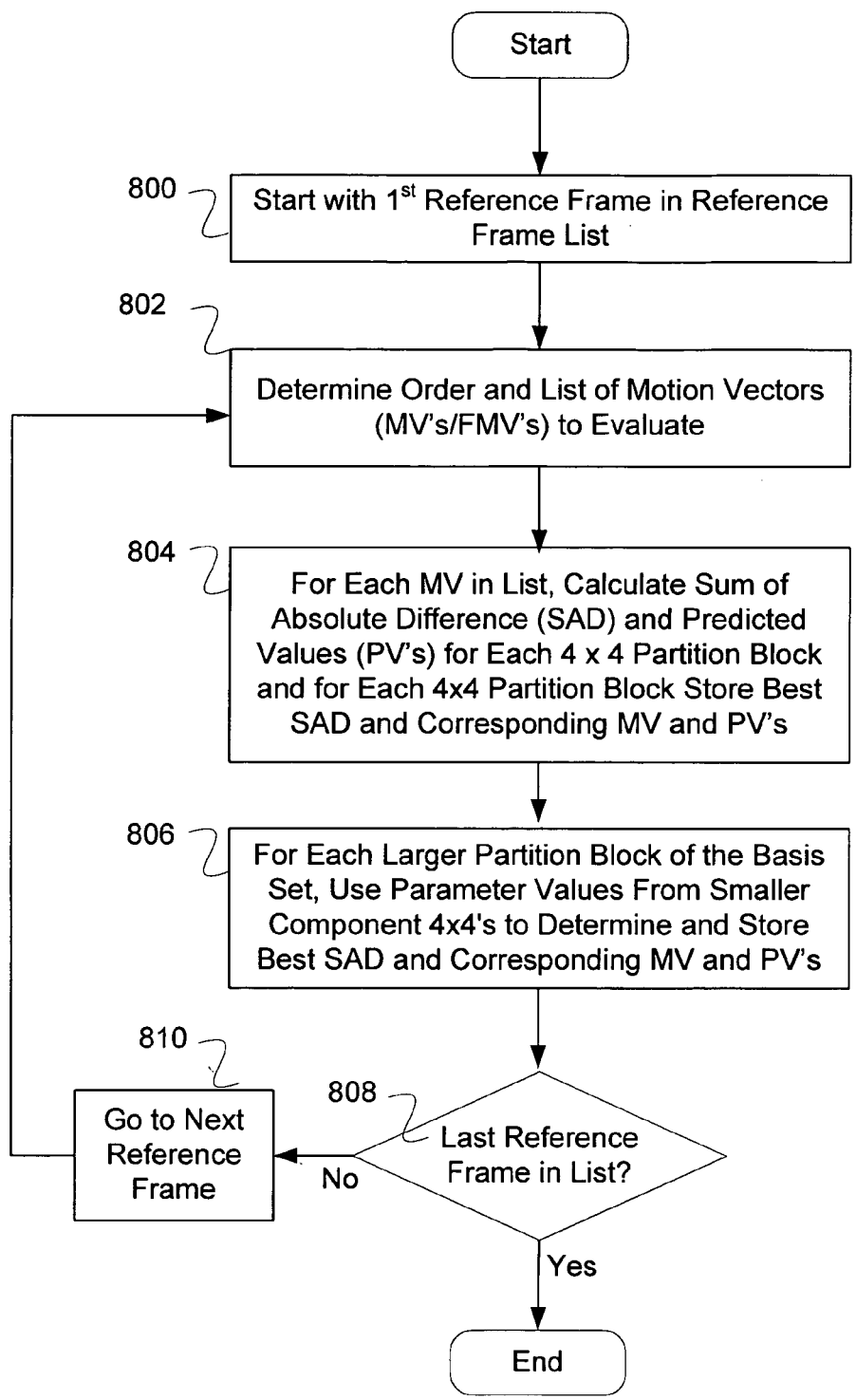
FIG. 8 illustrates an embodiment of a process for determining parameter values.

FIG. 8 illustrates an embodiment of a process for determining parameter values. In some embodiments, the process of FIG. 8 is used to implement 700 of FIG. 7. In the example illustrated, in 800 the process starts with a first reference frame in a current (e.g., forward, backward) reference frame list. In 802, a list and order of motion vectors (MV's)/fractional motion vectors (FMV's) to evaluate is determined for the reference frame currently being processed. In 804, for each motion vector/fractional motion vector in the list, a SAD value and predicted values (PV's) for each 4×4 second order partition block are calculated. As these parameter values are being calculated for each motion vector/fractional motion vector in the list, the best SAD and corresponding motion vector and prediction values are stored for each 4×4 second order partition block.

In 806, for each larger partition block of the basis set, the parameter values are calculated using the parameter values calculated for the 4×4 component second order partition blocks. For example, when an 8×4 second order partition block is constructed from two 4×4 second order partition blocks, the SAD value for the 8×4 second order partition block is calculated for the two identical motion vectors associated with the two 4×4 partition blocks. The best SAD value is selected and the corresponding motion vector and predicted values are stored. In 808, it is determined if it is the last reference frame in the reference frame list to evaluate. If it is the last reference frame in the reference frame list, then the process ends. If it is not the last reference frame in the reference frame list, then the next reference frame is selected in 810, and control passes to 802.

Figure 9:
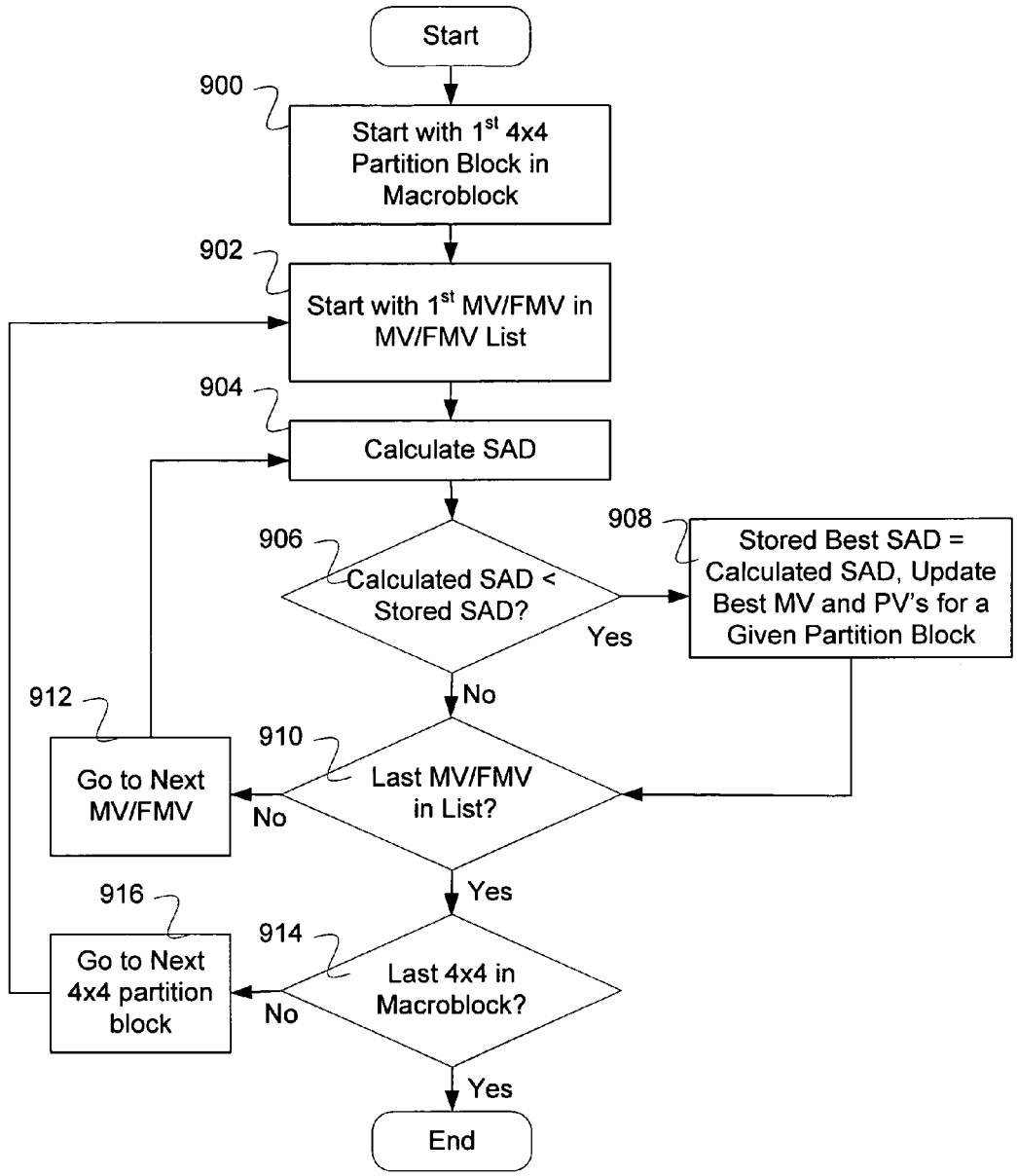
FIG. 9 illustrates an embodiment of a process for determining parameter values for each 4×4 second order partition block.

FIG. 9 illustrates an embodiment of a process for determining parameter values for each 4×4 second order partition block. In some embodiments, the process of FIG. 9 is used to implement 804 of FIG. 8. In the example illustrated, the process starts in 900 where a first 4×4 second order partition block in a macroblock is used for starting. In 902, a first motion vector/fractional motion vector in a motion vector/fractional motion vector list is used for starting. A SAD value is calculated in 904. In 906, it is determined if the calculated SAD value is less than the stored SAD value. If the calculated SAD value is less than the stored SAD value, then in 908 the stored value is set equal to the calculated value and the corresponding motion vector/fractional motion vector and predicted values are stored before control passes to 910. If the calculated SAD value is not less than the stored SAD value, then control passes to 910.

In 910, it is determined if the motion vector/fractional motion vector is the last in the list. If the motion vector/fractional motion vector is not the last in the list, then in 912 the next motion vector/fractional motion vector is selected and the next SAD value is calculated in 904. If the motion vector/fractional motion vector is the last in the list, then in 914 it is determined if it is the last 4×4 second order partition block in the macroblock. If it is not the last 4×4 second order partition block in the macroblock, then in 916 the next 4×4 second order partition block is selected and control passes to 902. If it is last 4×4 second order partition block in the macroblock, then the process ends.

Figure 10:
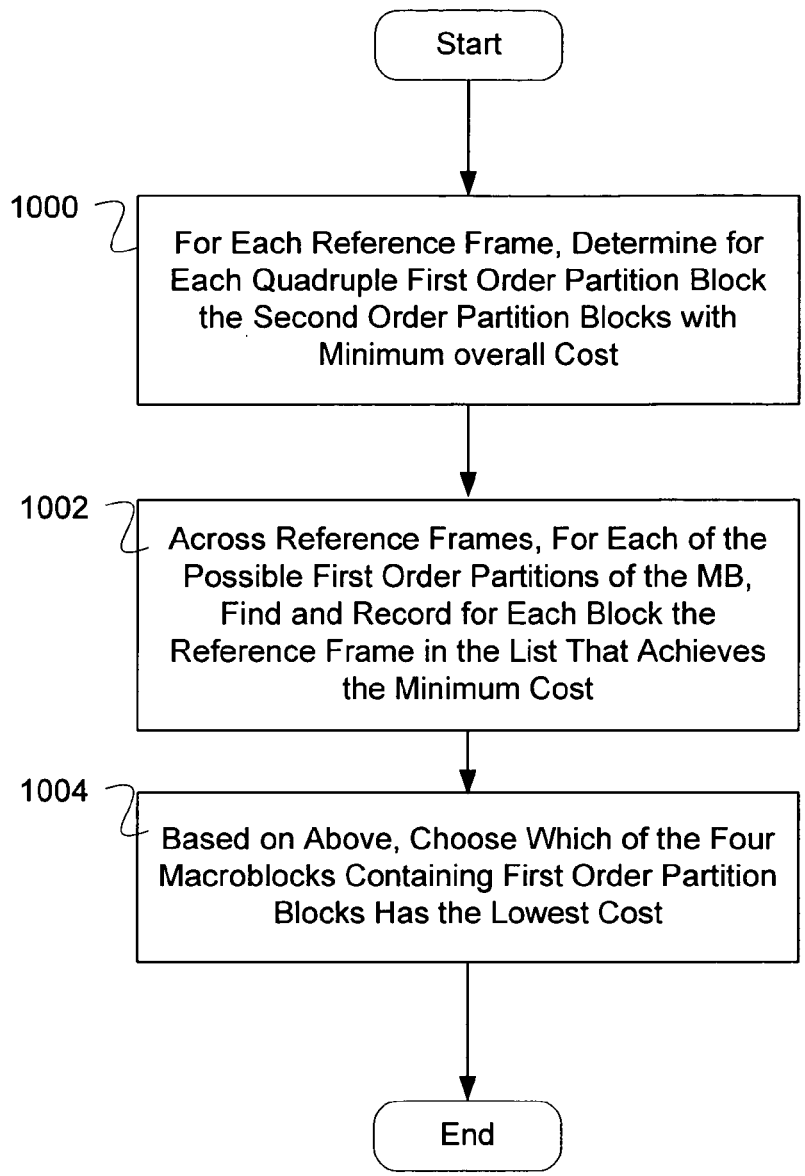
FIG. 10 illustrates an embodiment of a process for constructing the best partitioned macroblock.

FIG. 10 illustrates an embodiment of a process for constructing the best partitioned macroblock. In some embodiments, the process of FIG. 10 is used to implement 702 of FIG. 7. In 1000, the best second order partition block is determined using a minimum cost criteria for each of the four 8×8 first order quadruple partitions and for each reference frame. In 1002, for each first order partition block the reference frame that achieves the lowest approximate encoding cost for that first order partition block is determined. In 1004, the lowest cost of the four partitioned macroblocks formed by combining the "best" (i.e., lowest cost) first order partition block results determined in 1002 is determined.

Figure 11:
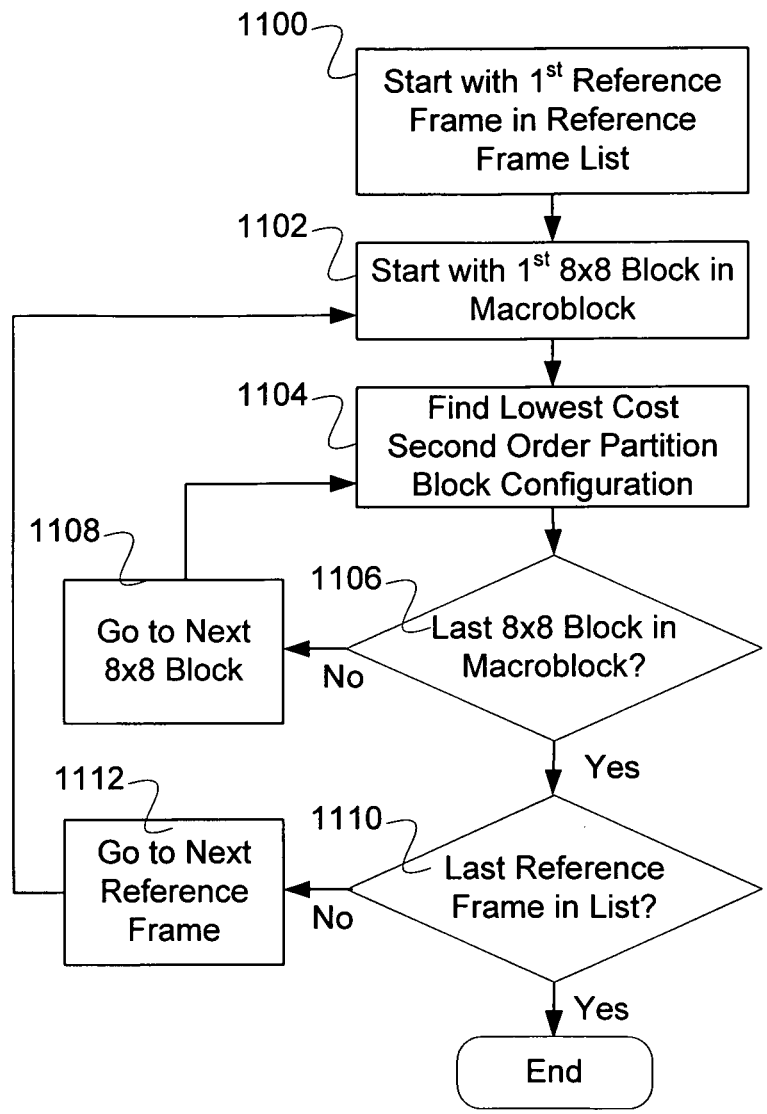
FIG. 11 illustrates an embodiment of a process for determining the best second order partition.

FIG. 11 illustrates an embodiment of a process for determining the best second order partition. In some embodiments, the process of FIG. 11 is used to implement 1000 of FIG. 10. In the example illustrated, the process starts in 1100 with a $1^{st}$ reference frame in a reference frame list. In 1102, processing begins with a first 8×8 first order partition block of the macroblock being encoded. In 1104, the lowest cost second order partition block configuration is determined. In 1106, it is determined if it is the last 8×8 first order partition block in the macroblock. If it is not the last 8×8 first order partition block in the macroblock, then in 1108 the next 8×8 first order partition block is selected and control passes to 1104. If it is the last 8×8 first order partition block in the macroblock, then in 1110 it is determined if it is the last reference frame in the list. If it is not the last reference frame in the list, then in 1112 the next reference frame is selected and control is passes to 1102. If it is the last reference frame in the list, then the process ends.

Figure 12:
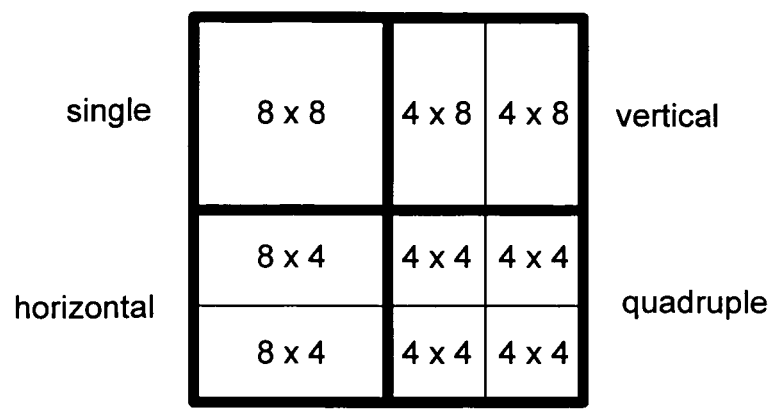
FIG. 12 illustrates an example of a best second order partition block for each 8×8 in a quadruple first order partition block in one embodiment.

FIG. 12 illustrates an example of a best second order partition block for each 8×8 in a quadruple first order partition block in one embodiment. In the example illustrated, the upper left quadruple of the macroblock, the best second order partition configuration contains a single second order partition block. In the upper right quadruple of the macroblock, the best second order partition configuration contains two vertical second order partition blocks. In the lower left quadruple of the macroblock, the best second order partition configuration contains two horizontal second order partition blocks. In the lower right quadruple of the macroblock, the best second order partition configuration contains four quadruple second order partition blocks. The overall SAD value for the macroblock can be calculated as the sum of:
 a. the stored best SAD value for the upper left quadrant single second order partition;
 b. the sum of the stored best SAD values for the two vertical blocks of the vertical second order partition;
 c. the sum of the stored best SAD values for the two horizontal blocks of the horizontal second order partition; and
 d. the sum of the stored best SAD values of the four blocks of the quadruple second order partition.

The corresponding motion vectors can also be easily retrieved from the stored best motion vectors. The predicted values for the macroblock are assembled as follows:
 a. the upper left 8×8 values are copied from the upper left 8×8 values of the stored predicted values array of shape 8×8;
 b. the upper right values are copied from the upper right 8×8 values of the stored predicted values array of shape 8×4;
 c. the lower left values are copied from the lower left 8×8 values of the stored predicted values array of shape 4×8; and
 d. the lower right values are copied form the lower right 8×8 values of the stored predicted values array of shape 4×4.

In some embodiments, each first order partition block of a macroblock has its own reference frame (or reference frames if it is bipredicted) but all second order partition blocks of a quadrant of a macroblock share the same reference frame (or reference frames if it is bipredicted).

Figure 13:
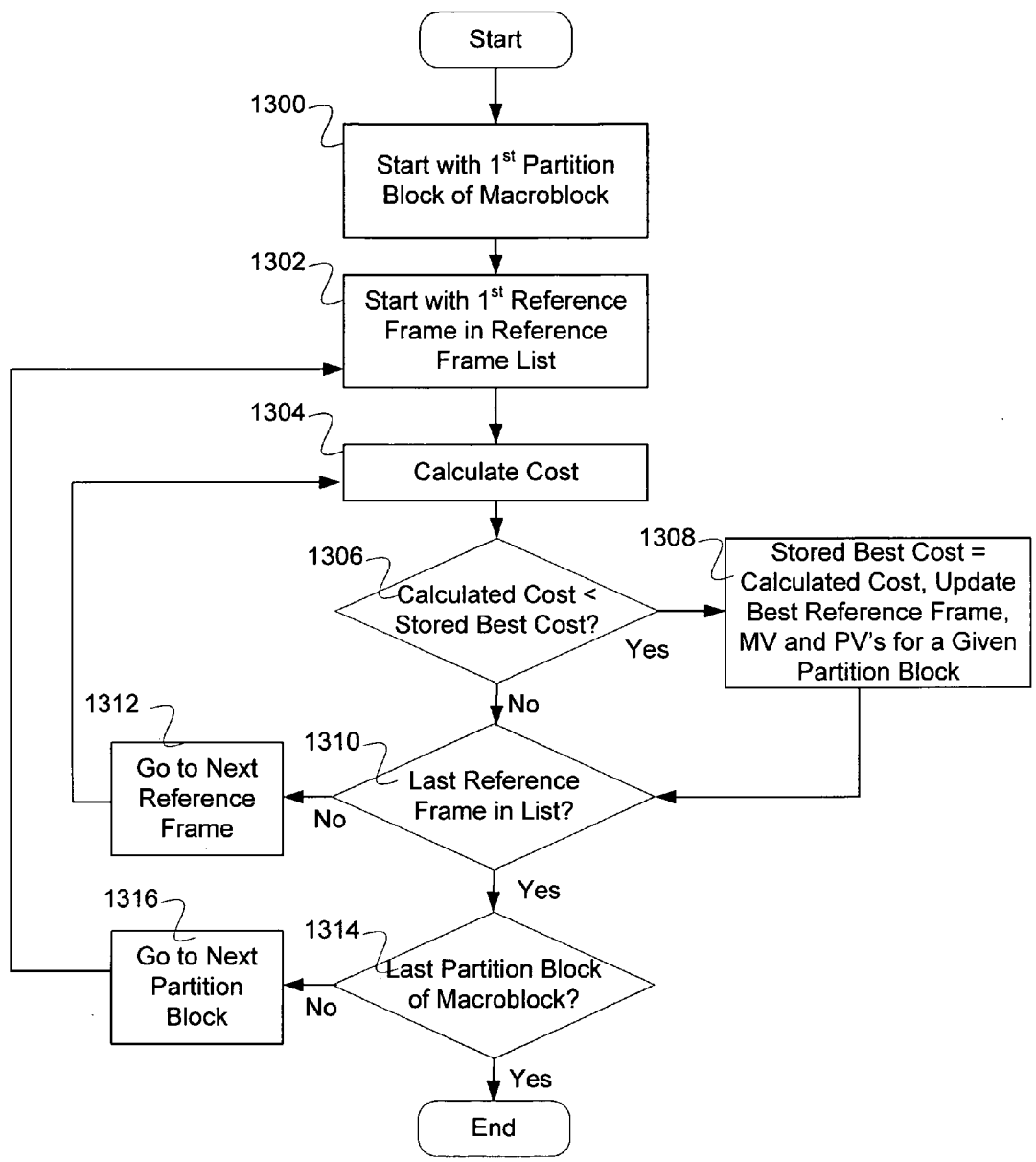
FIG. 13 illustrates an embodiment of a process for determining the best first order partition across reference frames.

FIG. 13 illustrates an embodiment of a process for determining the best first order partition across reference frames. In some embodiments, the process of FIG. 13 is used to implement 1002 of FIG. 10. In the example illustrated, the process starts in 1300 with a 1$^{st}$ first order partition block. Beginning at 1302 with a 1$^{st}$ reference frame in a reference frame list, at 1304 the estimated cost of using the reference frame currently being considered to encode the first order partition block is calculated using the parameter values calculated and stored previously for the partition block, as described above. In 1306, it is determined if the calculated estimated cost is less than the stored best cost. If the calculated estimated cost is less than the stored best cost, then in 1308 the stored best cost is set equal to the calculated estimated cost and the corresponding reference frame, motion vector and predicted values are stored as the current "best" result, and control is passed to 1310. If the calculated estimated cost is not less than the stored best cost, then control is passed to 1310. In 1310, it is determined if it is the last reference frame. If it is not the last reference frame, then in 1312 the next reference frame is selected and control passes to 1304. If it is the last reference frame, then in 1314, it is determined if it is the last first order partition block in the macroblock. If it is not the last first partition block in the macroblock, then in 1316 the next first partition block in the macroblock is selected and control passes to 1302. If it is the last first partition block in the macroblock, then the process ends.

Figure 14:
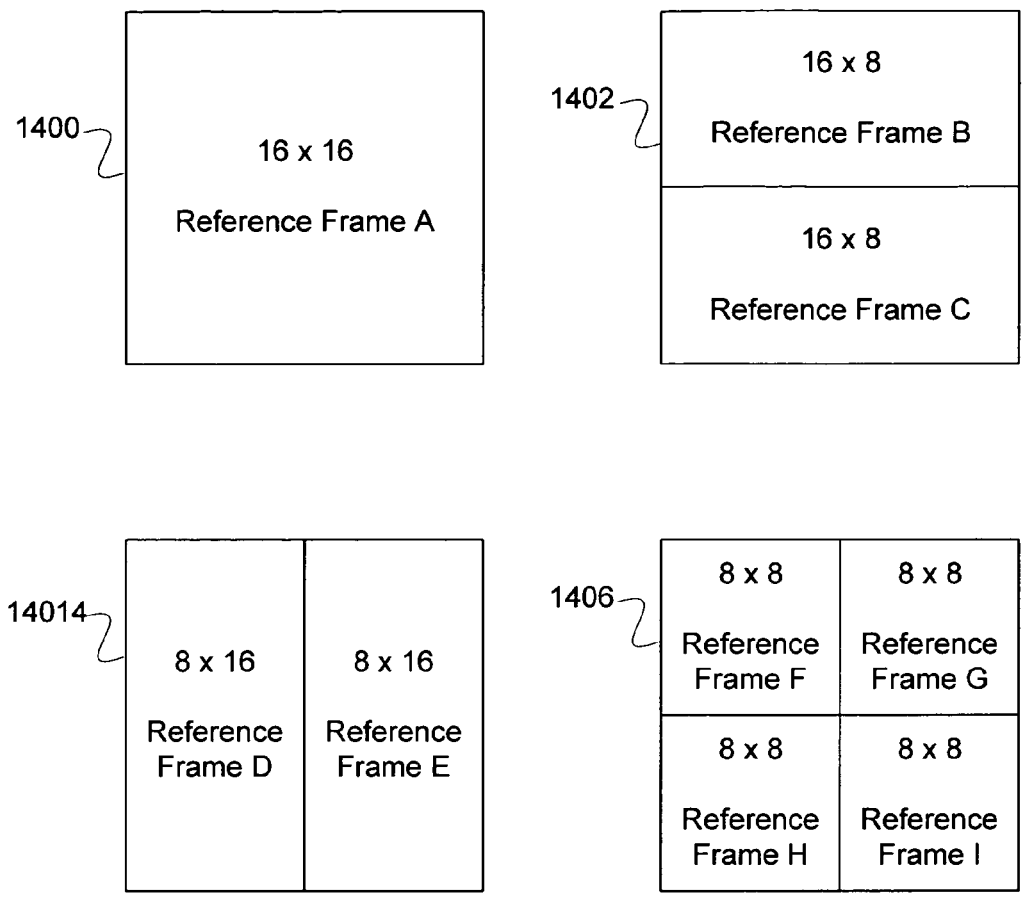
FIG. 14 illustrates an example of macroblocks containing the best first order partition blocks across reference frames in one embodiment.

FIG. 14 illustrates an example of macroblocks containing the best first order partition blocks across reference frames in one embodiment. In the example illustrated, the four macroblocks containing the best first order partition blocks are: a) the single first order partition block with a 16 pixel by 16 pixel area with a set of stored parameter values (including a SAD value, motion vector, and predicted values) corresponding to reference frame A (labeled 1400); b) the two horizontal first order partition blocks (labeled 1402) each with 16 pixel by 8 pixel areas, one horizontal block with a set of stored parameter values corresponding to reference frame B and the other horizontal block with a set of stored parameter values corresponding to reference frame C; c) the two vertical first order partition blocks (labeled 1404) each with 8 pixel by 16 pixel areas, one vertical block with a set of stored parameter values corresponding to reference frame D and the other vertical block with a set of stored parameter values corresponding to reference frame E, and d) the quadruple first order partition blocks (labeled 406) each with 8 pixel by 8 pixel areas, the four quadruple blocks each with a set of stored parameter values corresponding to reference frames F, G, H, and I.

Figure 15:
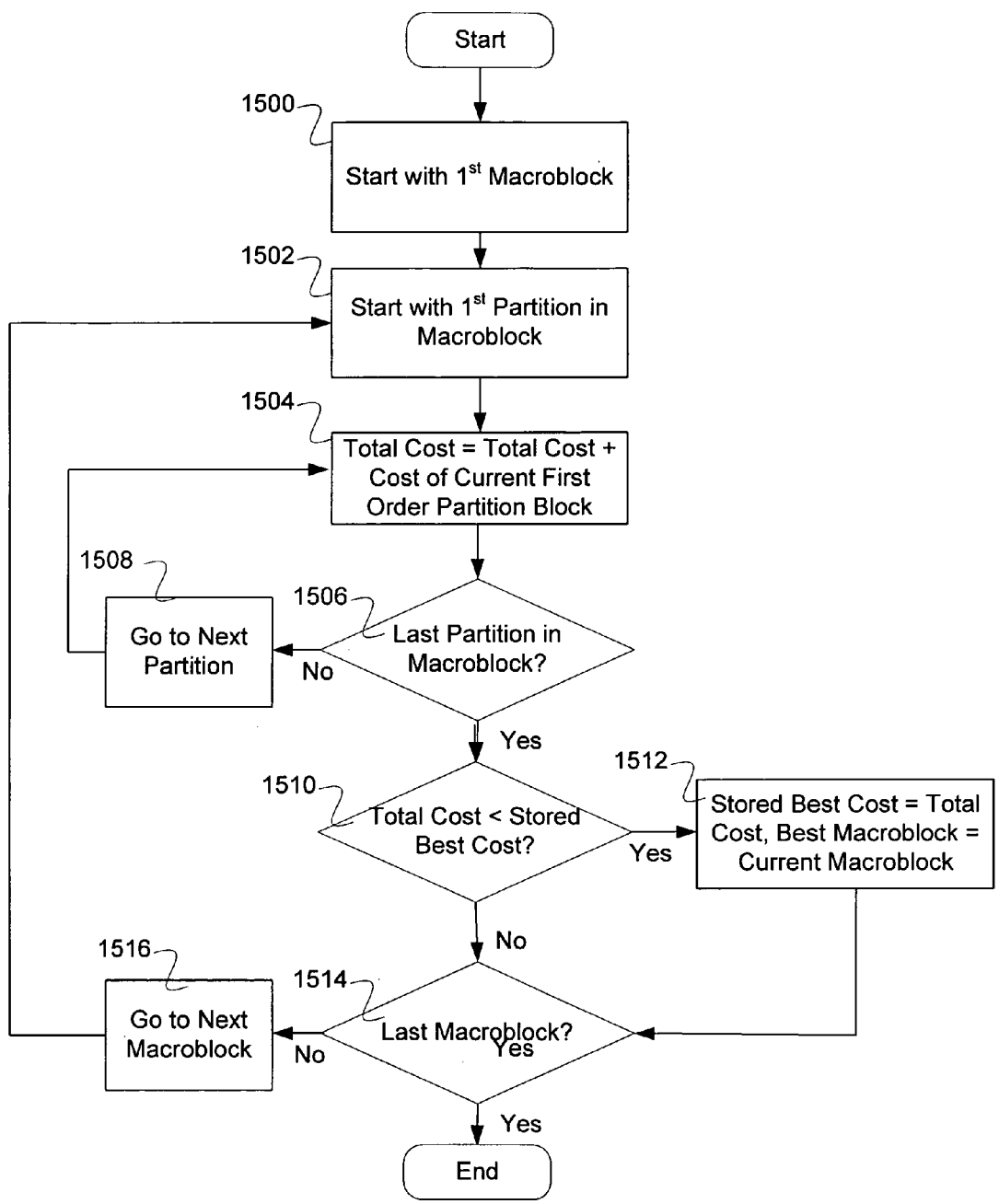
FIG. 15 illustrates an embodiment of a process for choosing which of the four macroblocks containing first order partition blocks has the lowest cost.

FIG. 15 illustrates an embodiment of a process for choosing which of the four partitioned macroblocks formed using the "best" first order partition blocks, e.g., as determined in 1002, has the lowest cost. In some embodiments, the process of FIG. 15 is used to implement 1004 of FIG. 10. In the example illustrated, in 1500 the process starts with a 1$^{st}$ macroblock containing first order partition blocks. In 1502, the process starts with a 1$^{st}$ first order partition block in the macroblock. In 1504, the total estimated cost is calculated by adding in the estimated cost for the current first order partition block into the total cost. In 1506, it is determined if it is the last first order partition in the macroblock. If it is not the last first order partition in the macroblock, then the next first order partition block is selected in 1508 and control passes to 1504. If it is the last first order partition in the macroblock, then in 1510, it is determined if the total cost is less than the stored best cost. If the total cost is less than the stored best cost, then the current total cost is stored as the best cost and the current macroblock is stored as the best macroblock and control passes to 1514. If the total cost is not less than the stored best cost, then control passes to 1514. In 1514, it is determined if it is the last macroblock. If it is not the last macroblock, then the next macroblock is selected in 1516, and control passes to 1502. If it is the last macroblock, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for encoding video data comprising: a processor configured to: organize video data into a plurality of macroblocks; calculate, using an encoder, a set of parameter values for a basis set of partition blocks of a macroblock of the video data, the basis set comprising one or more partition blocks into which the macroblock could validly be partitioned under an encoding scheme, wherein the basis set comprises fewer partition blocks than all valid partition combinations under the encoding scheme, wherein the set of parameter values is calculated for the basis set of partition blocks with respect to each of a plurality of reference frames, and the partitioning includes selecting partition blocks across reference frames, to the extent permitted under the encoding scheme, based at least in part on the respective sets of parameter values so as to minimize an estimated cost associated with the partitioned macroblock; select a partitioning of the macroblock into one or more partition blocks selected from the basis set based at least in part on the calculated set of parameter values without having to compute and track data for each possible way of partitioning the macroblock; an input port configured to input a video frame source; and an output port configured to output a compressed bit stream.

2. A system as in claim 1, wherein the set of parameter values includes for each partition block in the basis set a best solution data associated with a manner of encoding the partition block that is associated with a lowest estimated cost among at least a subset of valid options for encoding the partition block.

3. A system as in claim 1, wherein the set of parameter values includes for each partition block in the basis set a best solution data associated with a manner of encoding the partition block that is believed to have associated with it a lowest estimated cost among at least a subset of valid options for encoding the partition block wherein at least a subset of valid options for encoding the partition block is the set of valid options created by the combinations of partitioned blocks that can be constructed using the basis set.

4. A system as in claim 1, wherein the set of parameter values includes for each partition block in the basis set data associated with a motion vector that is associated with a lowest estimated cost among at least a subset of motion vectors available to be used to encode the partition block.

5. A system as in claim 1, wherein the set of parameter values includes for each partition block in the basis set a sum of absolute difference value associated with a motion vector that is, based at least in part on the sum of absolute difference value, associated with a lowest estimated cost among at least a subset of motion vectors available to be used to encode the partition block.

6. A system as in claim 1, wherein the processor is further configured to encode the macroblock based at least in part on the partitioned macroblock.

7. A system as in claim 1, wherein the processor is further configured to encode the macroblock based at least in part on the partitioned macroblock when the partitioned macroblock satisfies a criterion.

8. A system as in claim 7, wherein encoding includes estimating a compression cost for the partitioned macroblock.

9. A system as in claim 1, wherein partitioning includes estimating a compression cost for the partitioned macroblock.

10. A system as in claim 1, wherein the processor is further configured to estimate a compression cost for the partitioned macroblock.

11. A system as in claim 1, wherein the processor is further configured to identify the basis set of partitions.

12. A system as in claim 1, wherein the set of parameter values includes a sum of absolute difference value for each partition block in the basis set.

13. A system as in claim 1, wherein the set of parameter values includes for each partition block in the basis set a sum of absolute difference value associated with a motion vector associated with the partition block.

14. A system as in claim 1, wherein each partition block in the basis set is associated with one or more pixels comprising the macroblock and the set of parameter values includes for each partition block a predicted value for each pixel associated with the partition block.

15. A system as in claim 10, wherein estimating a compression cost is based on one or more sum of absolute difference values.

16. A system as in claim 10, wherein estimating a compression cost is based on a cost associated with a motion vector.

17. A system as in claim 10, wherein estimating a compression cost is based on a cost associated with a motion vector as determined based at least in part on the difference between a value associated with the motion vector and a corresponding value associated with a predicted motion vector determined according to the encoding scheme.

18. A system as in claim 10, wherein estimating a compression cost is based on a cost associated with encoding a reference frame identifier.

19. A method for encoding video data comprising: organizing video data into a plurality of macroblocks; calculating a set of parameter values for a basis set of partition blocks of a macroblock of the video data, the basis set comprising one or more partition blocks into which the macroblock could validly be partitioned under an encoding scheme, wherein the basis set comprises fewer partition blocks than all valid partition combinations under the encoding scheme, wherein the set of parameter values is calculated for the basis set of partition blocks with respect to each of a plurality of reference frames, and the partitioning includes selecting partition blocks across reference frames, to the extent permitted under the encoding scheme, based at least in part on the respective sets of parameter values so as to minimize an estimated cost associated with the partitioned macroblock; and select a partitioning of the macroblock into one or more partition blocks selected from the basis set based at least in part on the calculated set of parameter values without having to compute and track data for each possible way of partitioning the macroblock.

20. A method as in claim 19, wherein the set of parameter values includes for each partition block in the basis set a best solution data associated with a manner of encoding the partition block that is associated with a lowest estimated cost among at least a subset of valid options for encoding the partition block.

21. A method as in claim 19, further comprising encoding the macroblock based at least in part on the partitioned macroblock.

22. A method as in claim 19, further comprising estimating a compression cost for the partitioned macroblock.

23. A method as in claim 19, further comprising identifying the basis set of partitions.

24. A computer program product for encoding video data, the computer program product being embodied in a non-transitory computer readable storage medium and comprising computer instructions for: organizing video data into a plurality of macroblocks; calculating a set of parameter values for a basis set of partition blocks of a macroblock of the video data, the basis set comprising one or more partition blocks into which the macroblock could validly be partitioned under an encoding scheme, wherein the basis set comprises fewer partition blocks than all valid partition combinations under the encoding scheme, wherein the set of parameter values is calculated for the basis set of partition blocks with respect to each of a plurality of reference frames, and the partitioning includes selecting partition blocks across reference frames, to the extent permitted under the encoding scheme, based at least in part on the respective sets of parameter values so as to minimize an estimated cost associated with the partitioned macroblock; and select a partitioning of the macroblock into one or more partition blocks selected from the basis set based at least in part on the calculated set of parameter values without having to compute and track data for each possible way of partitioning the macroblock.

25. A computer program product as in claim 24, wherein the set of parameter values includes for each partition block in the basis set a best solution data associated with a manner of encoding the partition block that is associated with a lowest estimated cost among at least a subset of valid options for encoding the partition block.

26. A computer program product as in claim 24, further comprising encoding the macroblock based at least in part on the partitioned macroblock.

27. A computer program product as in claim 24, further comprising estimating a compression cost for the partitioned macroblock.

28. A computer program product as in claim 24, further comprising identifying the basis set of partitions.

29. A system as in claim 1, wherein the basis set of partition blocks includes a single partition block, two vertical partition blocks, two horizontal partition blocks, four quadruple partition blocks, eight vertical subpartition quadruple partition blocks, eight horizontal subpartition quadruple partition blocks, and sixteen quadruple subpartition quadruple partition blocks, whereby a basis set of forty-one partition blocks is used to construct any one of the 259 inter-prediction partitioned macroblocks that could validly be used under the MPEG4 video compression standard.

30. A system as in claim 1, wherein the basis set of partition blocks is smaller in number than the number of ways into which a macroblock is partitionable for encoding.

* * * * *